United States Patent [19]

Nikoh et al.

[11] Patent Number: 5,055,917
[45] Date of Patent: Oct. 8, 1991

[54] OUTPUT APPARATUS FOR IMAGE SIGNALS

[75] Inventors: Hidemitsu Nikoh; Hiroshi Morito, both of Tokyo, Japan

[73] Assignee: NEC Corporation, Tokyo, Japan

[21] Appl. No.: 350,493

[22] Filed: May 11, 1989

[30] Foreign Application Priority Data

May 11, 1988 [JP] Japan .................. 63-115877
May 23, 1988 [JP] Japan .................. 63-126561

[51] Int. Cl.$^5$ .............................. H04N 9/74
[52] U.S. Cl. ................................. 358/22; 358/21 R
[58] Field of Search ............ 358/22, 21 R, 14, 13, 358/29, 31, 224, 906, 310; 360/32

[56] References Cited

U.S. PATENT DOCUMENTS

| | | | |
|---|---|---|---|
| 4,554,576 | 11/1985 | Kao | 358/28 |
| 4,651,195 | 3/1987 | Stahler | 358/14 |
| 4,652,903 | 3/1987 | Lucas | 358/13 |
| 4,672,427 | 6/1987 | Rzeszewski | 358/13 |
| 4,689,661 | 8/1987 | Barbieri et al. | 358/13 |
| 4,758,880 | 7/1988 | McFetridge | 358/29 |
| 4,772,938 | 9/1988 | Sasson | 358/21 R |
| 4,807,055 | 2/1989 | Tsunoda et al. | 360/32 |
| 4,852,084 | 7/1989 | Verbiest et al. | 358/13 |

Primary Examiner—Edward L. Coles, Sr.
Assistant Examiner—Thomas D. Lee
Attorney, Agent, or Firm—Helfgott & Karas

[57] ABSTRACT

An output apparatus for image signals includes an image signal processing circuit for providing a digital luminance signal, a digital color signal, a digital composite video signal etc., a multiplexing circuit for multiplexing these signals to be positioned alternately on a time axis, a D/A converter for converting the digital multiplexed signal to an analog multiplexed signal, and plural signal holding circuits for an analog luminance signal, an analog color signal, an analog composite video signal etc. separated from the analog multiplexed signal, respectively. Therefore, only one D/A converter is used therein, so that the cost is decreased and the size becomes small.

2 Claims, 9 Drawing Sheets

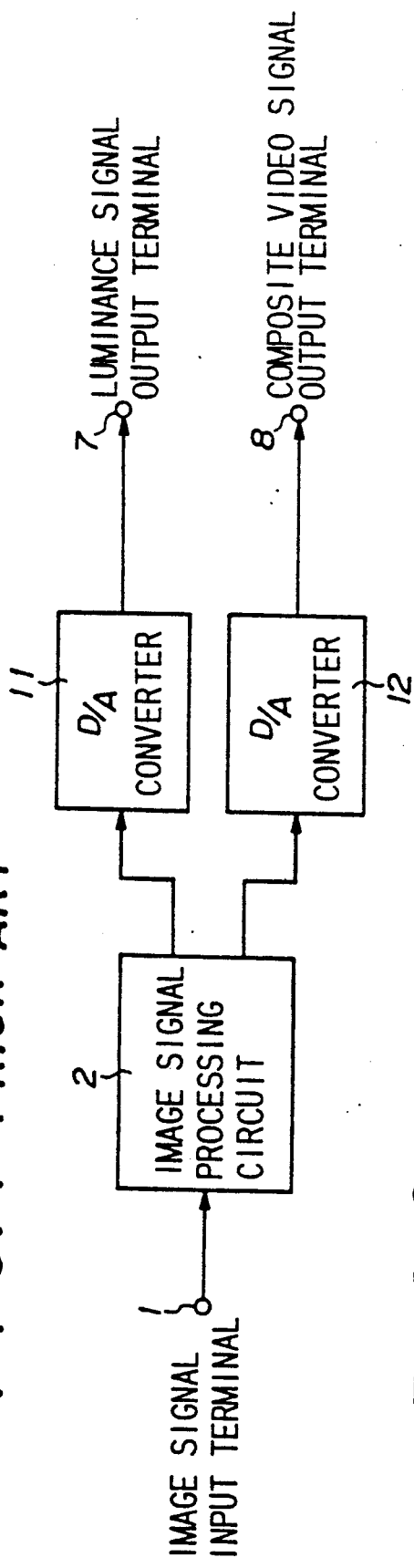
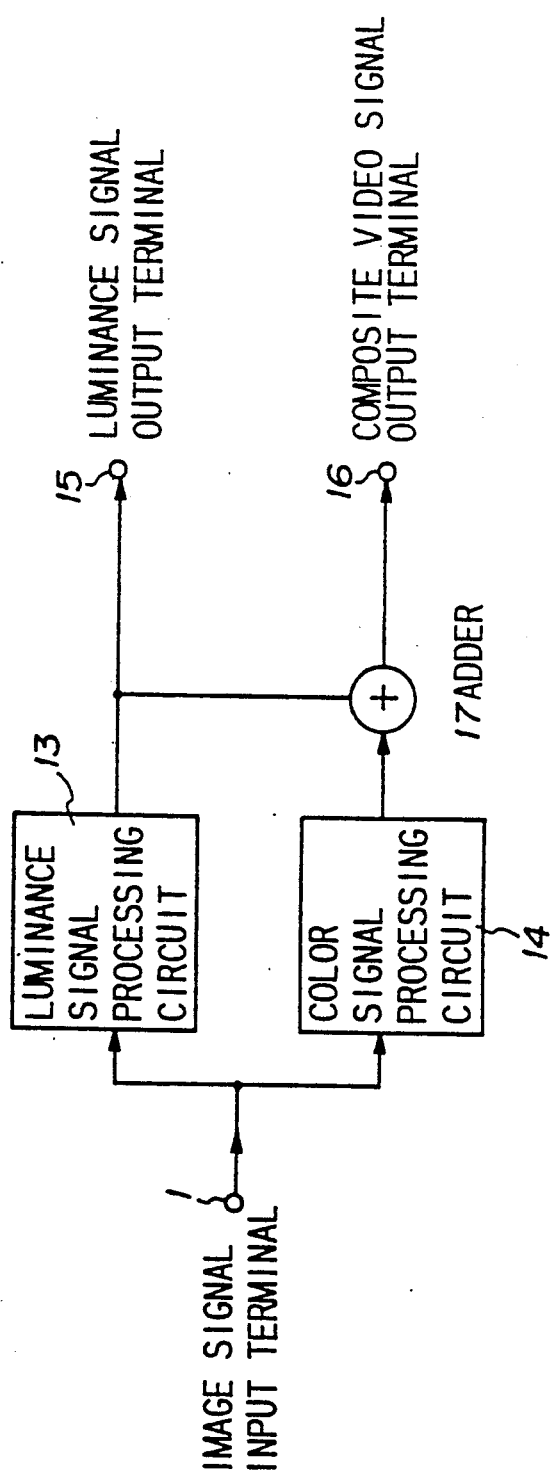
FIG. 1 PRIOR ART
FIG. 2

FIG. 6
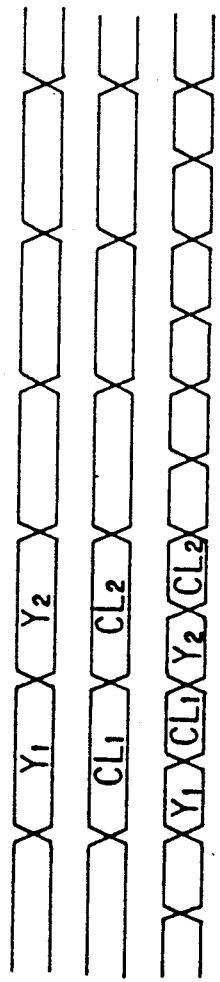
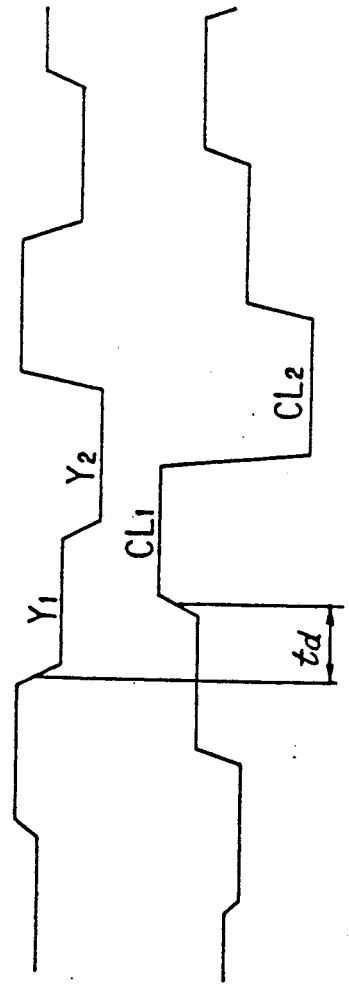
LUMINANCE SIGNAL Y_D
COLOR SIGNAL CL_D
MULTIPLEXED SIGNAL M
HELD LUMINANCE SIGNAL Y_A
HELD COLOR SIGNAL CL_A

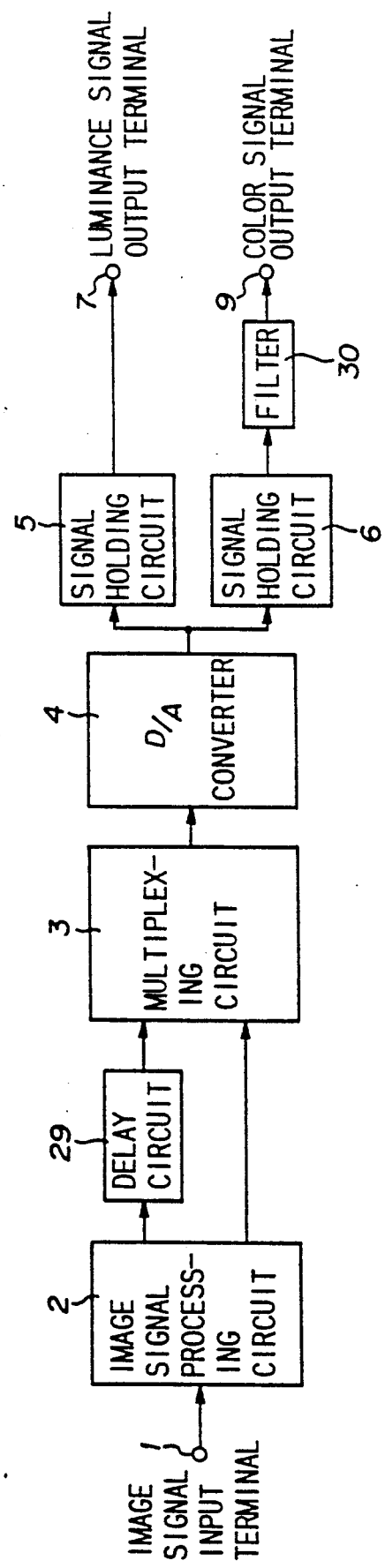

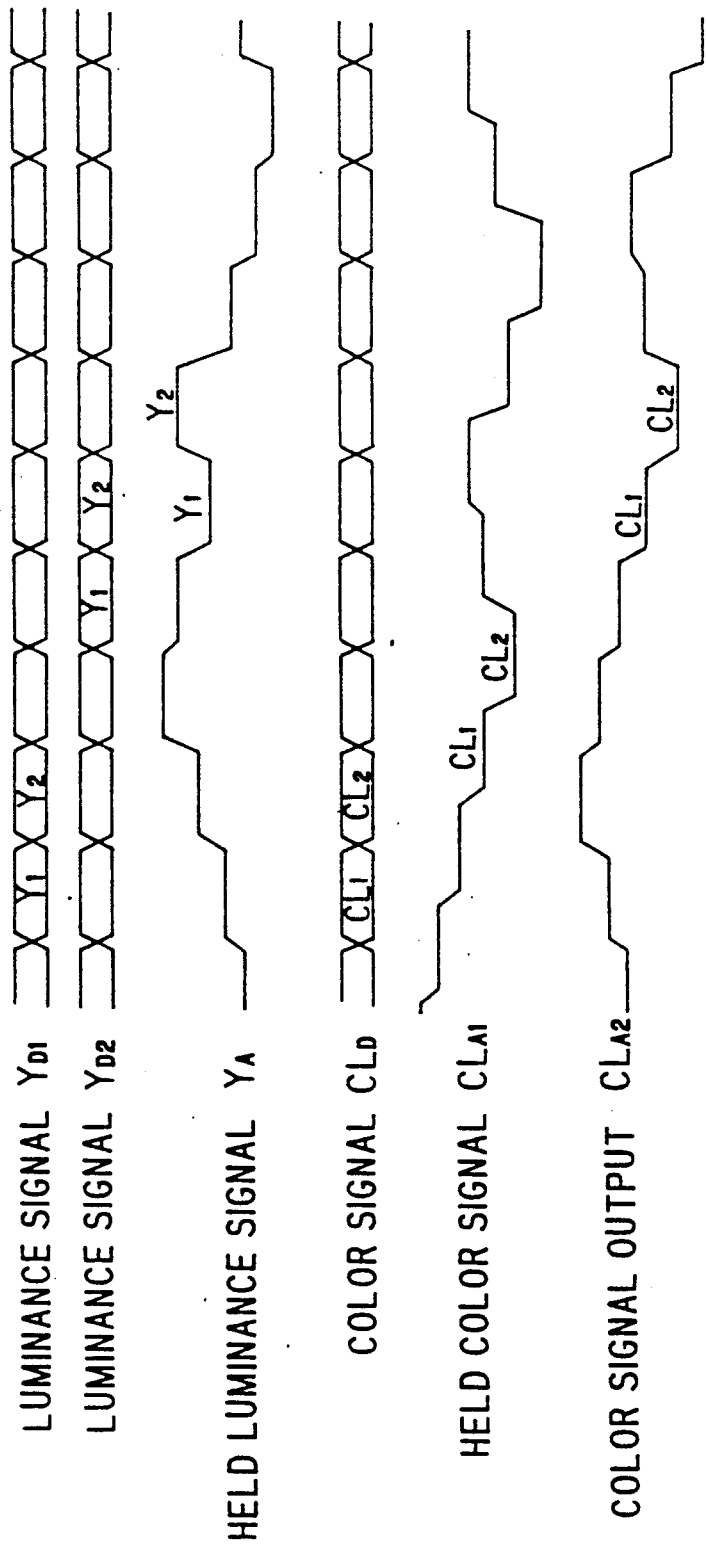

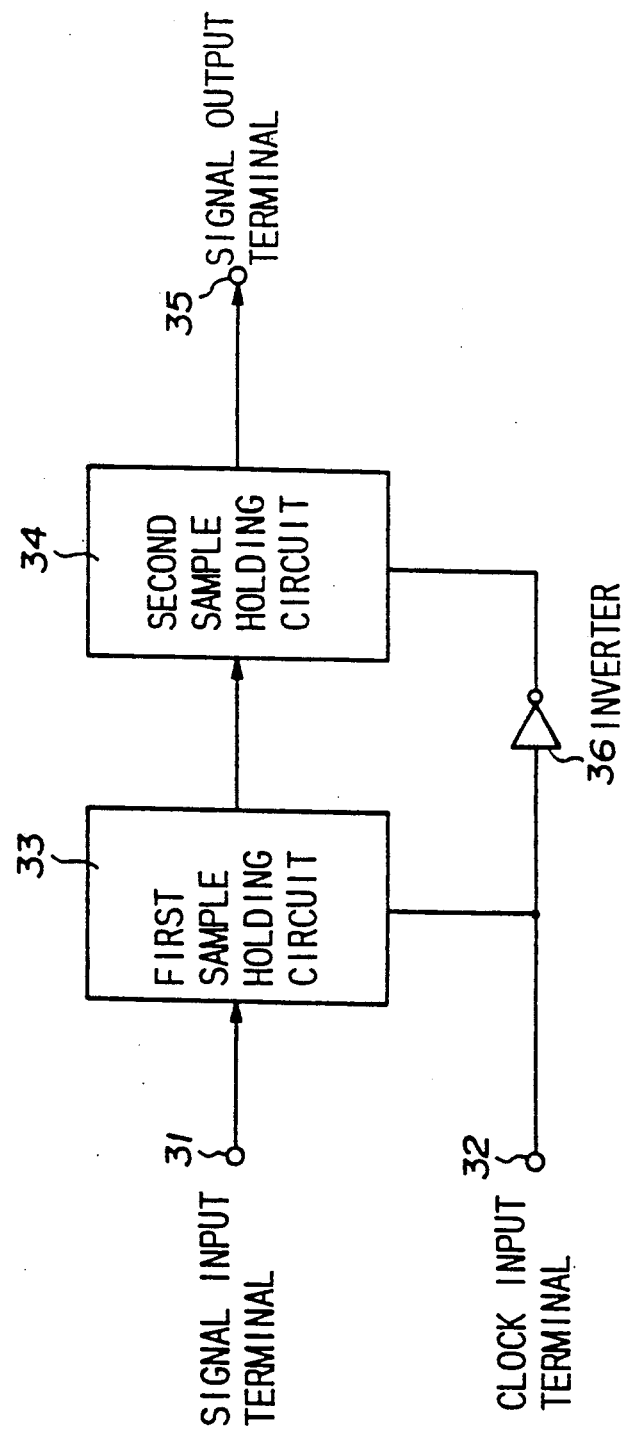

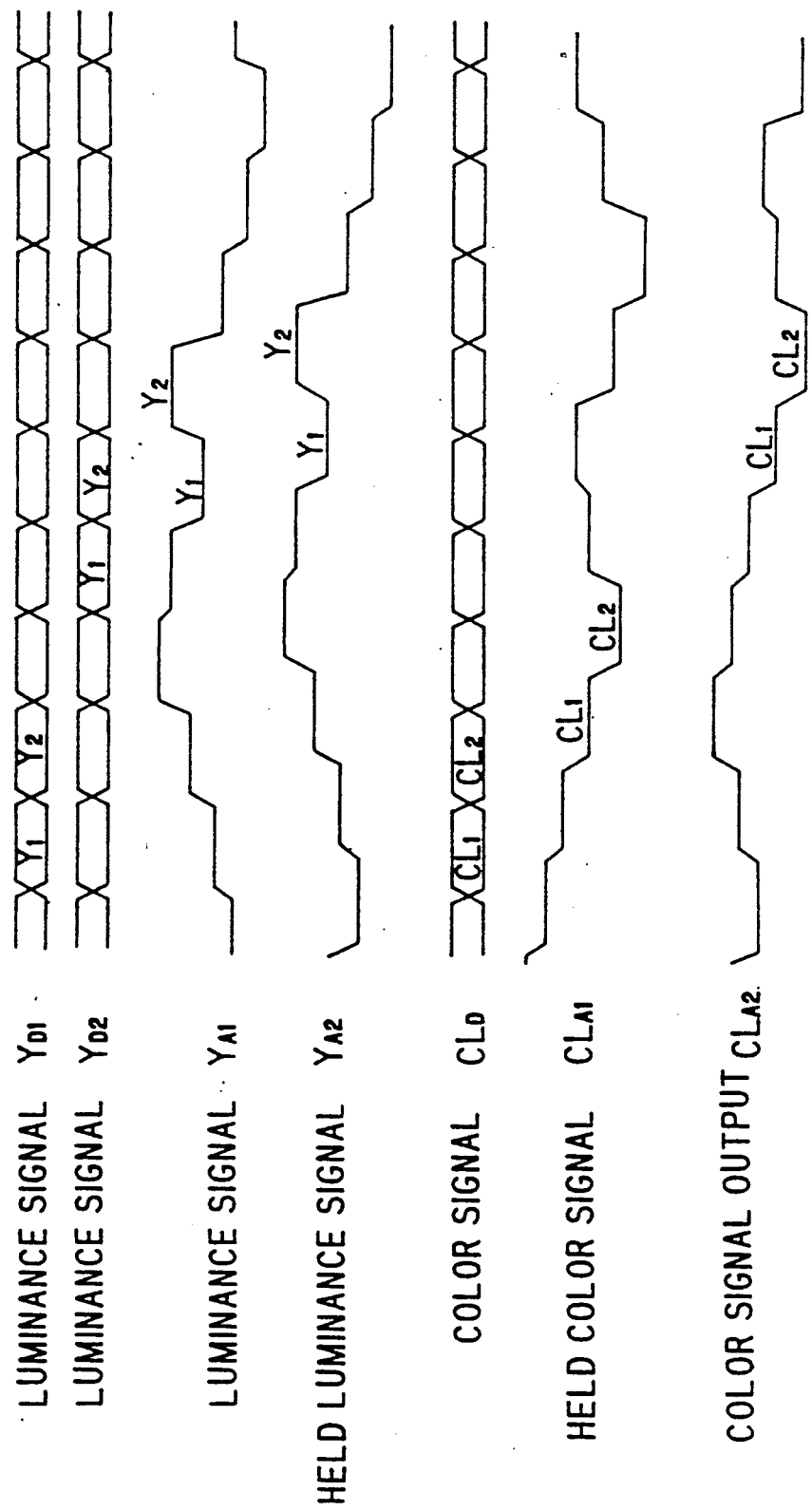

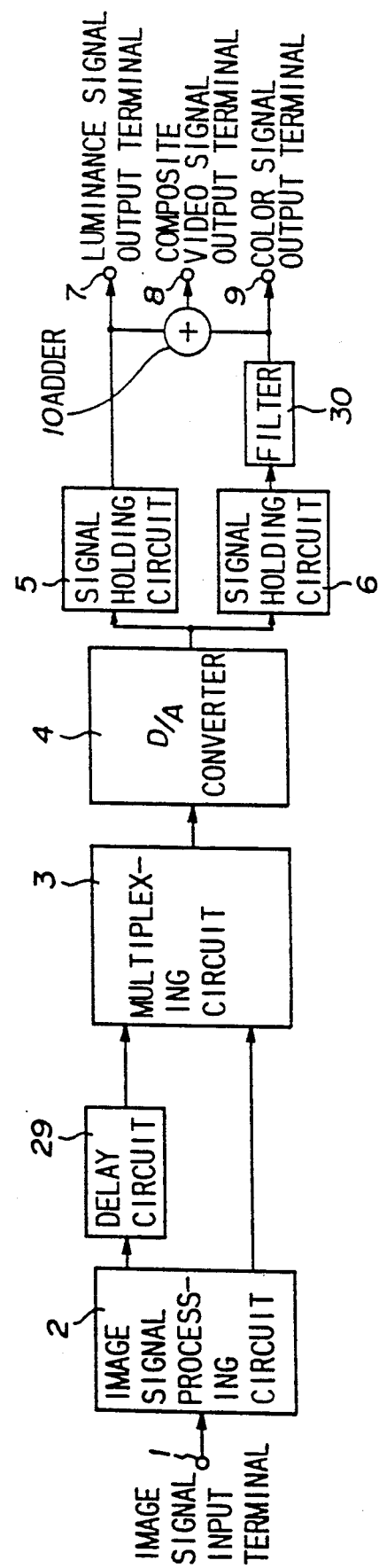

OUTPUT APPARATUS FOR IMAGE SIGNALS

FIELD OF THE INVENTION

The invention relates to an output apparatus for image signals, and more particularly to an output apparatus for image signals applicable to a TV (television), a VTR (video-tape-recorder), a VTR camera etc. from which plural output signals are supplied to a following stage

BACKGROUND OF THE INVENTION

One type of a conventional output apparatus for image signals is described on pages 21 and 22 of "The Television Institute's Technical Report, TEBS 96-5 May 24, 1984". The conventional output apparatus for image signals comprises an image signal processing circuit for digital-processing input image signals to provide a luminance signal and a composite video signal, and D/A converters for converting the digital luminance and composite video signals to analog luminance and composite video signals, respectively In a VTR camera, for instance, the digital luminance signal is used as a black-and white-video signal for a view finder, and the composite video signal is used as a main output. Such an image signal processing circuit is described on pages 372 to 378 of "IEEE Transactions on Consumer Electronics, Vol. CE-32, No. 3, August 1986".

In the conventional output apparatus for image signals, however, there is a disadvantage that D/A converters must be provided by the number equal to that of output signals such as the luminance signal, and the composite video signal. Therefore, the cost of the conventional output apparatus for image signals is difficult to be decreased because a D/A converter is high in cost as compared to other circuits. It tends that the number of D/A converters is increased because output signals such as signals separated from a luminance signal and a color modulated signal, a line sequential signal etc. are produced in addition to the black-and white-monitoring signal and the composite video signal as described before.

There is a further disadvantage that the conventional output apparatus for image signals is difficult to be included in a single integration circuit because the number of D/A converters is increased to result in the increase of the number of input and output terminals. As a result, the size of the conventional output apparatus for image signals becomes large.

SUMMARY OF THE INVENTION

Accordingly, it is an object of the invention to provide an output apparatus for image signals in which the number of D/A converters is decreased, thereby resulting in the decrease of the cost.

It is a further object of the invention to provide an output apparatus for image signals, the size of which is suppressed to be large.

According to the invention, an output apparatus for image signals comprises an image signal processing circuit for providing a digital luminance signal, and at least one signal selected from a digital color signal and a digital composite video signal in accordance with a digital processing an image signals supplied from a signal input terminal, a multiplexing circuit for multiplexing the digital luminance signal and at least one signal to be positioned alternately on a time axis, and a delay circuit provided between one of outputs of the image signal processing circuit and one of inputs of the multiplexing circuit. The delay circuit delays a digital signal supplied from the one of outputs to the one of inputs by a predetermined time. The apparatus further includes a D/A converter for converting a digital output signal of the multiplexing circuit to an analog multiplexed signal, and at least two signal holding circuits for holding the analog multiplexed signal which is separated into an analog luminance signal and an analog signal corresponding to the aforementioned at least one signal. One of the two signal holding circuits is connected to a signal output terminal and holds the analog luminance signal and the other of the two signal holding circuits is connected to another signal output terminal and holds the analog signal. A filter is provided between an output of the signal holding circuit selected from the two signal holding circuits and a signal output terminal corresponding to the output of said signal holding circuit. The filter performs a band limitation of an analog signal supplied from the output of said signal holding circuit to the signal output terminal corresponding thereto and delays the analog signal by a predetermined time.

BRIEF DESCRIPTION OF DRAWINGS

The invention will be explained in more detail in conjunction with appended drawings wherein:

FIG. 1 is a block diagram showing a conventional output apparatus for image signals, FIG. 2 is a block diagram showing an image signal processing circuit which is used in the conventional output apparatus for image signals as shown in FIG. 1, FIG. 6 is a timing chart explaining operation of the second embodiment, FIG. 7 is a block diagram showing an output apparatus for image signals in a third embodiment according to the invention, FIG. 8 is a timing chart explaining operation of the third embodiment, FIG. 9 is a block diagram showing a signal holding circuit which is used in the third embodiment, FIG. 10 is a timing chart explaining operation of the third embodiment in which the signal holding circuit is used as shown in FIG. 9, and FIG. 11 is a block diagram showing an output apparatus for image signals in a fourth embodiment according to the invention.

DESCRIPTION OF PREFERRED EMBODIMENT

Figure 3:
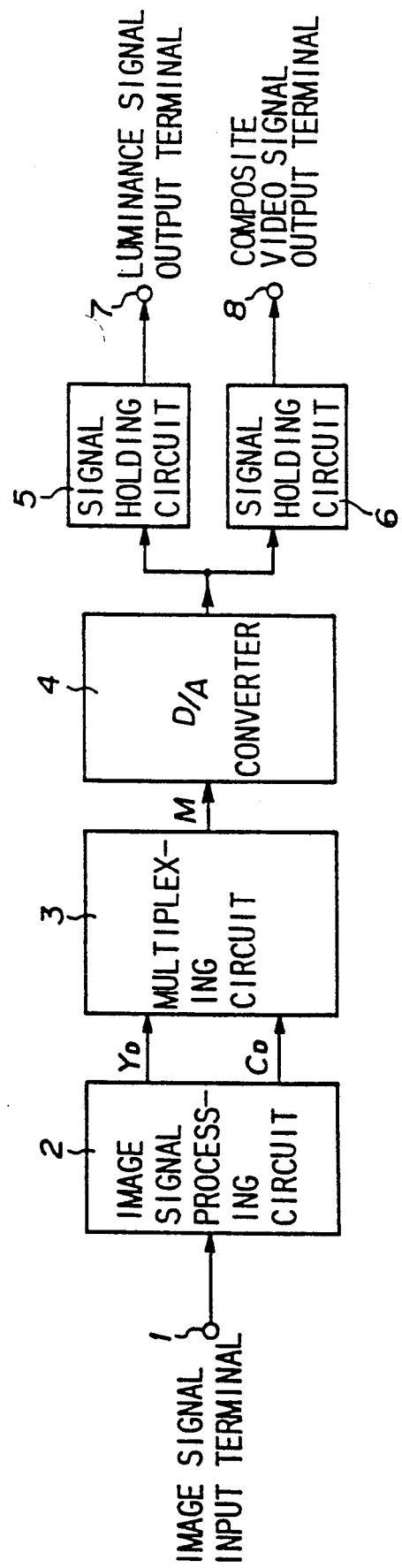
FIG. 3 is a block diagram showing an output apparatus for image signals in a first embodiment according to the invention.

Before explaining an output apparatus for image signals according to the invention, the aforementioned conventional output apparatus for image signals will be explained.

FIG. 1 shows the output apparatus for image signals which comprises an image signal processing circuit 2 for digital-processing image signals supplied to an image signal input terminal 1 to provide a luminans signal and a composite video signal, a D/A converter 11 for converting the digital luminans signal to an analog luminance signal which is supplied to an luminous signal output terminal 7, and a D/A converter 12 for converting the digital composite video signal to an analog composite video signal which is supplied to a composite video signal output terminal 8.

FIG. 2 shows the image signal processing circuit 2 which comprises a luminance signal processing circuit 13 for digital-calculating luminance signals to provide the digital luminance signal which is a black-and-white-monitoring signal, a color signal processing circuit 14 for digital-calculating color signals to provide the digital color signal, an adder 17 for adding the digital luminance signal and the color signal to provide the digital composite video signal, and output terminals 15 and 16, respectively, connected to the D/A converters 11 and 12.

In operation, image signals are supplied to the image signal input terminal 1, and then processed in the image signal processing circuit 2. In the image signal processing circuit 2, the luminance signal is supplied from the luminance signal processing circuit 13 to the adder 17 and through the luminance signal output terminal 15 to the D/A converter 11, and the color signal is supplied from the color signal processing circuit 14 to the adder 17. In the adder 17, the luminance signal and the color signal are added to provide the composite video signal which is supplied therefrom through the composite video signal output terminal 16 to the D/A converter 12. In the D/A converters 11 and 12, the digital luminance signal and the digital composite video signal are converted to the analog luminance signal and the analog composite video signal, respectively The aforementioned disadvantages of the conventional output apparatus for image signals are not explained here.

Next, an output apparatus for image signals in a first embodiment according to the invention will be explained in FIG. 3. The output apparatus for image signals comprises an image signal processing circuit 2 for digital-processing image signals supplied to an image signal input terminal 1, a multiplexing circuit 3 for multiplexing a digital luminance signal and a digital composite video signal, respectively, supplied from the image signal processing circuit 2, a D/A converter 4 for converting the digital luminance signal and the digital composite video signal in time-division to an analog luminance signal and an analog composite video signal, and signal holding circuits 5 and 6 for holding the analog luminance and composite video signals which are supplied to luminance and composite video signal output terminals 7 and 8, respectively.

Figure 4:
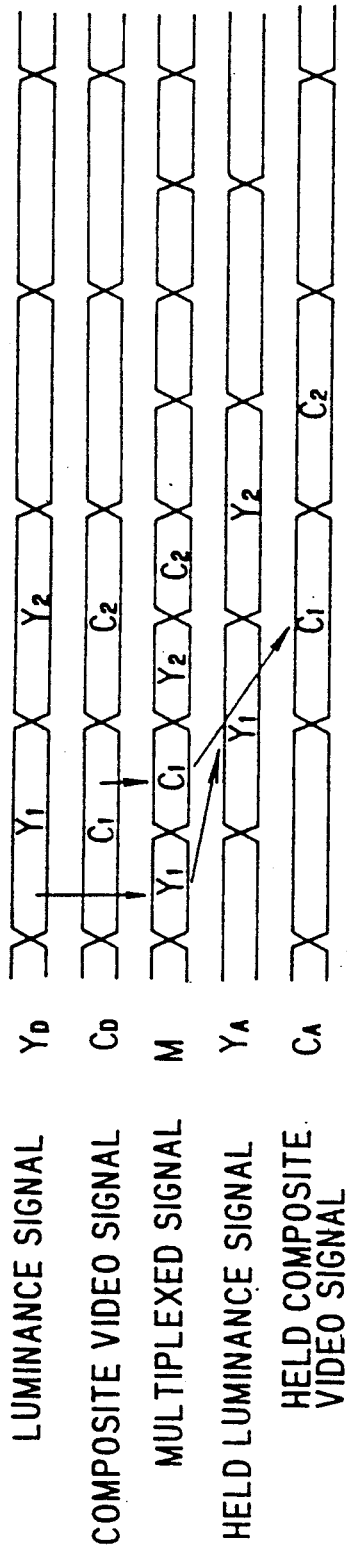
FIG. 4 is a timing chart explaining operation of the first embodiment.

In operation, image signals are supplied to the image signal input terminal 1, and then processed in the image signal processing circuit 2, for instance, as explained in FIG. 2, so that a luminance signal $Y_D(Y_1, Y_2, \ldots)$ and a composite video signal $C_D(C_1, C_2, \ldots)$ are supplied in serial digital data trains to the multiplexing circuit 3 as shown in FIG. 4. Each of the digital data $Y_1, Y_2 \ldots$ and $C_1, C_2 \ldots$ is of several bits forming a serial or parallel signal. The luminance and composite video signals $Y_D$ and $C_D$ are multiplexed serially in the multiplexing circuit 3 to provide a multiplexed signal M in which the two signals are positioned alternately one after another as shown in FIG. 4. The multiplexed signal M is converted from digital to analog in the D/A converter 4, so that the analog luminance signal $Y_A(Y_1, Y_2, \ldots)$ and the analog composite video signal $C_A(C_1, C_2, \ldots)$ are supplied alternately to the signal holding circuits 5 and 6 in which the two signals are held correspondingly. As a result, the analog luminance signal $Y_A$ and the analog composite video signal $C_A$ are supplied through the output terminals 7 and 8 to a following stage, respectively, as shown in FIG. 4.

Figure 5:
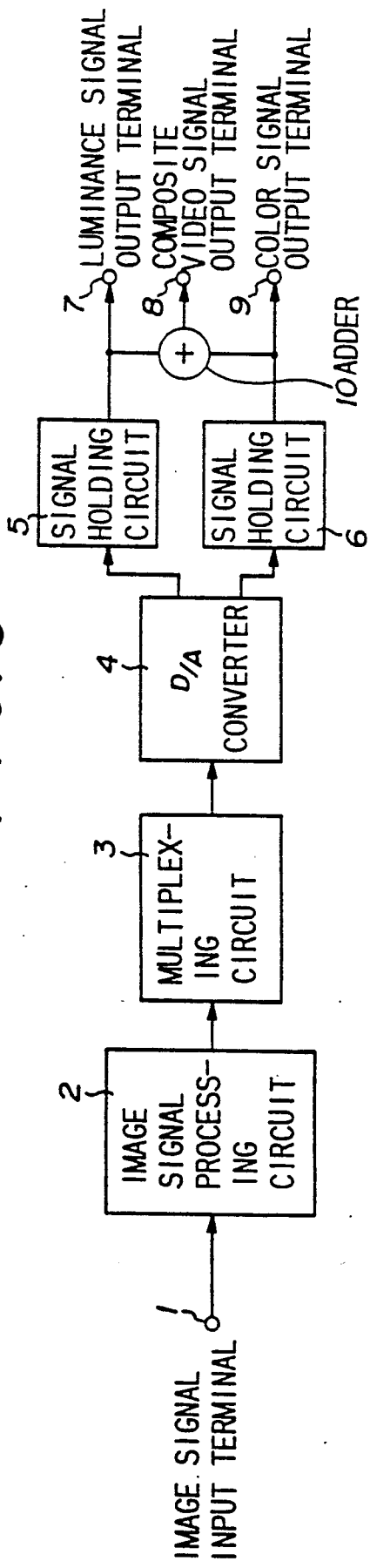
FIG. 5 is a block diagram showing an output apparatus for image signals in a second embodiment according to the invention.

FIG. 5 shows an output apparatus for image signals in a second embodiment according to the invention. In the output apparatus for image signals, like parts are indicated by like reference numerals in FIG. 3, provided that the image signal processing circuit 2 does not include the aforementioned adder 17, but the luminance signal processing circuit 13 and the color signal processing circuit 14 as shown in FIG. 2. Instead, the output apparatus for image signals comprises an adder 10 provided between outputs of the signal holding circuits 5 and 6 and connected to the composite video signal output terminal 8. Furthermore, the signal holding circuits 5 and 6 are connected to luminance and color signal output terminals 7 and 9.

In operation, image signals are supplied to the image signal input terminal 1, and then processed in the image signal processing circuit 2 to provide a digital luminance signal and a digital color signal which are multiplexed serially in the multiplexing circuit 3 to provide a digital multiplexed signal Then, the digital multiplexed signal is converted in the D/A converter 4 to an analog multiplexed signal which is separated into an analog luminance signal and an analog color signal sequentially, and the analog luminance signal is held in the signal holding circuit 5, while the analog color signal is held in the signal holding circuit 6. The analog luminance and color signals supplied from the signal holding circuits 5 and 6 are added in the adder 10 to provide a composite video signal supplied to the composite video signal output terminal 8. At the same time, the analog luminance and color signals are directly supplied to the luminance and color signal output terminals 7 and 9, respectively.

In the first and second embodiments, the object of the invention in which the number of D/A converters is decreased is realized. In addition, a following disadvantage is desired to be overcome in the invention. This will be explained in the output apparatus for image signals in the second embodiment FIG. 6 shows the digital luminance signal $Y_D$, the digital color signal $CL_D$, the digital multiplexed signal M, the analog luminance signal $Y_A$, and the analog color signal $CL_A$. In FIG. 6, the digital luminance signal $Y_1$ corresponds to the digital color signal $CL_1$ in a relation of signal produced in an image at the same time, and the digital luminance signal $Y_2$ to the digital color signal $CL_2$. These signals $Y_1$, $CL_1$, $Y_2$, $CL_2$, ... are multiplexed serially to provide the digital multiplexed signal M, such that the corresponding signals $Y_1$ and $CL_1$, $Y_2$ and $CL_2$, ... are arranged at different positions on a time axis. Consequently, a time deviation "td" which is equal to a time duration of the multiplexed luminance signal $Y_1$, $Y_2$, ... or the multiplexed color signal $CL_1$, $CL_2 \ldots$ is resulted between the analog luminance signal $Y_1$, $Y_2 \ldots$ and the analog color signal $CL_1$, $CL_2$, ...

Furthermore, it is often adopted that a band limitation is applied to the color signal by use of a bandpass filter. In such a case, the time deviation "td" is increased due to a time delay induced in the bandpass filter. This disadvantage is overcome in a third embodiment which will be explained in FIG. 7. The same time delay is also observed in FIG. 4.

FIG. 7 shows an output apparatus for image signals in the third embodiment in which like parts are indicated by like reference numerals in FIG. 5, provided that the adder 10 is not provided therein, but a delay circuit 29 is provided between the image signal processing circuit 2 and the multiplexing circuit 3, and a filter 30 is provided between the signal holding circuit 6 and the color signal output terminal 9.

In operation, image signals are supplied to the image signal input terminal 1, and then processed in the image signal processing circuit 2 to provide a digital luminance signal $YD_1$ ($Y_1, Y_2, \ldots$) and a digital color signal $CL_D$ ($CL_1, CL_1, \ldots$), wherein the data $Y_1, Y_2 \ldots$ correspond to the data $CL_1, CL_2 \ldots$, respectively, on a time axis, as shown in FIG. 8. The digital luminance signal $YD_1$ is delayed in the delay circuit 29 by a time equal to the length of three data, so that a digital luminance signal $YD_2$ ($Y_1, Y_2, \ldots$) is obtained as shown in FIG. 8. Thereafter, the digital luminance signal $YD_2$ and the digital color signal $CL_D$ are multiplexed in the multiplexing circuit 3 to provide a digital multiplexed signal which is then converted to an analog multiplexed signal, so that the analog multiplexed signal is separated into an analog luminance signal $Y_A$ and an analog color signal $CL_{A1}$ which are then held in the signal holding circuits 5 and 6, respectively, in the same manner as explained in the first and second embodiments. The luminance data $Y_1, Y_2, \ldots$ are delayed by a time equal to the length of one datum in the multiplexing circuit 3 and the D/A converter 4, while the color data $CL_1, CL_2 \ldots$ are delayed by a time equal to the length of one and half data as shown in FIG. 8. As a result, a time difference of two and half data occurs between the analog luminance signal $Y_A$ and the analog color signal $CL_{A1}$. The analog color signal $CL_{A1}$ is passed through the filter 30 to receive a band limitation of the color signal. Consequently, the analog color signal $CL_{A1}$ is delayed by a time equal to the length of two and half data, so that the analog luminance signal $Y_A$ and the analog color signal $CL_{A2}$ are supplied to the luminance signal output terminal 7 and the color signal output terminal 9, respectively, which are restored with a synchronous time relation as shown in FIG. 8.

Although the delay time of the filter 30 is a time equal to the length of two and half data in the third embodiment, it may be changed dependent on a circuitry structure. As a matter of course, the delay time of the delay circuit 29 may be changed in compliance with a changed delay time of the filter 30. Since the delay circuit 29 is of a digital type, it is easy to provide a predetermined amount of a time delay based on a unit which is one datum On the other hand, where a time which is delayed in the filter 30 deviates in a period less than the length of one datum, for instance, where a time which is half a datum deviates in a delay of three data, such a deviation can not be compensated by the delay circuit 29. In such a case, a signal holding unit as shown in FIG. 9 is used for the compensation of the delay time deviation.

FIG. 9 shows the signal holding unit which comprises first and second sample holding circuits 33 and 34, and an inverter 16, wherein an input of the first sample holding circuit 33 is connected to a signal input terminal 31, an output of the first sample holding circuit 33 is connected to an input of the second sample holding circuit 34, and an output of the second sample holding circuit 34 is connected to a signal output terminal 35. Furthermore, the first sample holding circuit 33 operates in accordance with clocks supplied from a clock input terminal 32, and the second sample holding circuit 34 operates in accordance with inverted clocks supplied from the inverter 36 which is connected to the clock input terminal 32.

In operation, signals which are supplied to the signal input terminal 31 are to be held in the first sample holding circuit 33 in accordance with the clocks applied to the clock input terminal 32, and signals which are held in the first sample holding circuit 33 are to be held in the second sample holding circuit 34 in accordance with the inverted clocks supplied from the inverter 36, so that signals at the signal output terminal 35 are delayed by a half clock rate as compared to those which appear at the signal output terminal 35 where only the first sample holding circuit 33 is provided.

Where the signal holding unit as shown in FIG. 9 is adopted in the output apparatus for image signals as shown in FIG. 7, a time equal to a half datum period is delayed under a condition that one clock rate is one datum period.

FIG. 10 shows a timing chart in operation, wherein the signal holding unit of FIG. 9 is used as the signal holding circuit 5 in the output apparatus for image signals of FIG. 7, which includes the filter 30 having a delay time equal to the length of three data. The analog color signal $CL_{A2}$ is delayed behind the analog color signal $CL_{A1}$ by a delay time of the filter 30 equal to three data, and is delayed behind the analog luminance signal $Y_{A1}$ supplied from the D/A converter 7 by a half datum period. In this situation, the analog luminance signal $Y_{A2}$ passed through the signal holding circuit 5 (the same as the signal holding unit as shown in FIG. 9) is delayed by a half datume period, so that the analog luminance signal $YA_2$ appearing at the signal output terminal 7 is corrected to coincide with the analog color signal $CL_{A2}$ on a time axis.

FIG. 11 shows an output apparatus for image signals in a fourth embodiment according to the invention. The output apparatus for image signals is the same as that in the third embodiment, except that an adder 10 is further provided. First and second inputs of the adder 10 are connected to outputs of the signal holding circuit 5 and the filter 30, respectively, and an output of the adder is connected to a composite video signal output terminal 8.

In operation, an analog luminance signal of the signal holding circuit 5 and an analog color signal of the filter 30 are supplied to the luminance signal output terminal 7 and the color signal output terminal 9, respectively, and are added in the adder 10 to provide a composite video signal which is supplied to the composite video signal output terminal 8.

In general, transmitting and receiving of image signals are carried out in image apparatus by use of a composite video signal. In such a case, a time deviation between a luminance signal and a color signal must be suppressed, and band limitations for the both signals become strict. In these points, the invention is very advantageous.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An output apparatus for image signals, comprising:

an image signal processing circuit for providing a digital luminance signal, and at least one signal selected from a digital color signal and a digital composite video signal in accordance with a digital processing of image signals supplied from a signal input terminal;

a multiplexing circuit for multiplexing said digital luminance signal and at least one signal to be positioned alternately on a time axis;

a delay circuit connected between one of outputs of said image signal processing circuit and one of inputs of said multiplexing circuit, said delay circuit delaying a digital signal supplied from said one of outputs to said one of inputs by a predetermined time;

a D/A converter for converting a digital output signal of said multiplexing circuit into an analog multiplexed signal;

at least two signal holding circuits for holding said analog multiplexed signal which is separated into an analog luminance signal and an analog signal corresponding to said at least one signal, one of said at least two signal holding circuits being connected to a signal output terminal and holding said analog luminance signal, and the other of said at least two signal holding circuits being connected to another signal output terminal and holding said analog signal; and a filter provided between an output of a signal holding circuit selected from said at least two signal holding circuits and a signal output terminal corresponding to said output of said signal holding circuit, said filter performing a band limitation of an analog signal supplied from said output of said signal holding circuit to said signal output terminal corresponding thereto, and delaying said analog signal by a predetermined time, wherein the filter is connected to the output of the selected signal holding circuit for holding a D/A conversion signal of a signal which is different from the digital signal delayed by the delay circuit.

2. An output apparatus for image signals, comprising:

an image signal processing circuit for providing a digital luminance signal, and at least one signal selected from a digital in accordance with a digital composite video signal in accordance with a digital processing of image signals supplied from a signal input terminal;

a multiplexing circuit for multiplexing said digital luminance signal and at least one signal to be positioned alternately on a time axis;

a delay circuit provided between one of outputs of said image signal processing circuit and one of inputs of said multiplexing circuit, said delay circuit delaying a digital signal supplied from said one of outputs to said one of inputs by a predetermined time;

a D/A converter for converting a digital output signal of said multiplexing circuit into an analog multiplexed signal;

at least two signal holding circuits for holding said analog multiplexed signal which is separated into ana analog luminance signal and an analog signal corresponding to said at least one signal, one of said at least two signal holding circuits being connected to a signal output terminal and holding said analog luminance signal, and the other of said at least two signal holding circuits being connected to another signal output terminal and holding said analog signal; and a filter provided between an output of a signal holding circuit selected from said at least two signal holding circuits and a signal output terminal corresponding to said output of said signal holding circuit, said filter performing a band limitation of an analog signal supplied from said output of said signal holding circuit to said signal output terminal corresponding thereto, and delaying said analog signal by a predetermined time, wherein at least one of said at least two signal holding circuits includes first and second sample holding circuits connected in a cascade pattern to each other, said first sample holding circuit being driven by a predetermined frequency of clock signals, and said second sample holding circuit being driven by inverted clock signals of said clock signals.

* * * * *